United States Patent Office 2,833,735
Patented May 6, 1958

2,833,735

CATALYZED ORGANOSILOXANE MIXTURE AND METHOD OF TREATING TEXTILES THEREWITH

Siegfried Nitzsche and Ewald Pirson, Burghausen, Oberbayern, Germany, assignors to Wacker Chemie G. m. b. H., Munich, Germany No Drawing. Application March 14, 1955
Serial No. 494,288

Claims priority, application Germany March 13, 1954

5 Claims. (Cl. 260—29.1)

The present invention relates to a novel mixture of organopolysiloxanes and complex titanium or zirconium curing catalysts which is particularly suitable for the hydrophobing of textiles.

It has been suggested in the art that various oily or resinous organopolysiloxanes can be employed for hydrophobing textiles. It has been found, however, that textiles treated with the so-called "silicone oils" cannot be cleaned without losing the hydrophobing effect. Textiles treated with resinous silicones have the disadvantage that the fabric becomes too stiff and the desirable soft "hand" of the material is lost. In order to develop any reasonable degree of resistance to laundering or dry cleaning, fabrics treated with these oils or resins must be cured at undesirably high temperatures. This makes the process both uneconomical and undesirable because of the thermal degradation of the fabric.

The only commercially successful silicone hydrophobing agent for textiles developed thus far in the art is one which utilizes an organohydrogenpolysiloxane, e. g. polymers containing $(CH_3HSiO)$ units. Fabrics treated with the latter materials do not require as high a curing temperature as those treated with the above discussed resins and oils. Even so, temperatures in the neighborhood of 150° C. are usually necessary, and such temperatures are found to be undesirable for many textile fibers. A further disadvantage of the latter compounds is that they tend to split out hydrogen during storage, thus requiring a number of obviously necessary precautions. Furthermore the organohydrogenchlorosilanes, from which the latter compounds must be prepared, are obtained only in relatively small amounts from the usual commercial processes for the production of organochlorosilanes. Therefore, the increasing need for suitable silicone hydrophobing agents for textiles has taxed the industry's ability to produce the necessary intermediates.

In accordance with the present invention, it has been found that an outstanding impregnating and hydrophobing agent, particularly for textiles, exists in a mixture of (1) an organopolysiloxane oil having the average general formula

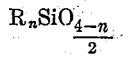

where $n$ has an average value of from 1.8 to 2.5 inclusive and R represents a monovalent hydrocarbon radical, (2) an organopolysiloxane resin which is free of polymeric units of the formula $SiO_2$ and which has the average general formula

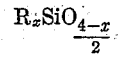

where R is as above defined and $x$ has an average value of from 1.0 to 1.7 inclusive; and (3) a curing catalyst which is a complex enolate of a metal in group IVB of the periodic table having an atomic number from 22–40 inclusive, the enolate being formed from an aliphatic enol compound having a molecular weight of less than 300, said mixture of siloxanes being substantially free of any siloxane polymeric units containing silicon-bonded hydrogen atoms. The periodic table referred to above is not that of Mendeleef, but rather that published by the Fisher Scientific Company, reproduced on page 392 of the 37th edition of the "Handbook of Chemistry and Physics."

The catalysts defined above are thus titanium or zirconium chelates (or "enolates") in which the organic portion of the complex is derived from an enol-type compound of the described type, or the reaction products of the defined enol-type compounds with a titanium or zirconium alcoholate wherein the alcoholate radical is that of a mono- or polyhydric alcohol, preferably of from 1–10 carbon atoms, e. g. ethanol, isopropanol, butanol, 2-ethylhexanol, glycols, etc. The preferred enols used in the preparation of either the chelates or the alcoholate-enol reaction products are acetylacetone, acetoacetic acid, esters of acetoacetic acid (particularly the lower alkyl esters wherein the alkyl group contains from 1–8 carbon atoms, among which the ethyl esters are most preferred), and similar esters of malonic acid.

The organopolysiloxane oils employed in this invention are well known in the art, and can be composed of polymeric units of the formula $RSiO_{1.5}$, $R_2SiO$, $R_3SiO_{0.5}$. If desired, small amounts of $SiO_2$ polymeric units can also be present as long as the material is a liquid material and the average degree of substitution remains within the defined range of from 1.8–2.5 organic radicals per silicon atom. The "R" groups can be any monovalent hydrocarbon radical and can be the same or different on the various Si atoms. Examples of such radicals are alkyl radicals, e. g. methyl, ethyl, propyl, octadecyl, etc., alkaryl and aralkyl radicals; and aryl radicals such as phenyl. Halogenated hydrocarbon radicals can also be employed in these compounds if desired. The most suitable and most commercially available materials are those wherein all of the organic radicals are methyl and/or ethyl. The viscosity of these oils can vary within extremely wide limits, but ordinarily lies in the region between 10 and 1,000,000 cs. at 25° C.

The organopolysiloxane resins employed in this invention have the average general formula

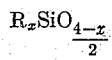

where R is as above defined and $x$ has an average value of from 1.0 to 1.7 inclusive. These resins can contain mono-, di-, or tri-organosiloxane units, as long as the average degree of substitution falls within the defined limits. These resins, however, are free of polymeric units of the formula $SiO_2$, since resins containing such units impair the desired effect on textiles. The methyl- and ethyl-polysiloxane resins are particularly desirable.

The ratio of organopolysiloxane resin to organopolysiloxane oil in the above defined mixture can be varied within wide limits, the relative amounts of each depending almost entirely upon the specific effects desired in the treated textiles. As the amount of resin is increased, the fabric will become increasingly stiff. In some fabrics, a crisper or stiffer "hand" is desirable; in other fabrics, a very soft "hand" is desired. Thus the exact proportions of these two components will depend almost entirely upon the type of material being treated and the effect desired by the manufacturer. In general, however, the ratio of oil to resin lies in the region of from 50–90 percent by weight of the oil to 50–10 percent by weight of the resin, both of these percentages being based upon the total weight of the organopolysiloxanes present in the mixture. Both of the siloxane constituents of this mixture should be substantially free of polymeric units containing silicon-bonded hydrogen atoms.

It is to be understood that although the organosiloxanes employed herein have been described as having the average general formula

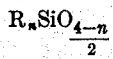

or

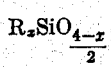

(such definitions being conventional in the art), these polymers can also contain relatively small amounts of alkoxy, aryloxy, or hydroxy groups attached to some of their silicon atoms. It is common for the commercially available silicones to have some of the latter substituents present, particularly the hydroxy substituents, in amounts up to 0.5–10 percent by weight.

A wide range is also permissible in the amount of the defined curing catalyst which is present. Ordinarily from 0.5–25 inclusive percent by weight of these catalysts is employed, with the preferred amount lying in the range of from 5–20 percent by weight, based upon the weight of the total organopolysiloxanes present.

The defined mixture can be used as an impregnating agent for materials other than textiles. In such uses, one can take advantage of the well-known thermal and electrical insulating properties of silicones. As an impregnating agent for the preparation of electrical insulation, etc., the mixture can be used in any concentration. When employed as a hydrophobing agent for textiles, however, the concentration of the organopolysiloxanes is ordinarily kept at from 1–20 percent by weight of the siloxane components in any of the common organic solvents. Examples of suitable solvents are the chlorohydrocarbons such as carbon tetrachloride and perchloroethylene, aromatic hydrocarbons such as benzene and toluene, petroleum solvents such as naphtha, and various organic ethers and esters.

The mixture defined in this invention displays a number of advantages as compared to the known impregnating and hydrophobing organosiloxanes. The defined mixture is very stable in solution and can be stored and handled without special precautions. Any of the natural or synthetic fibers can be treated therewith. After brief heating to temperatures of 90 to 110° C., the silicone is firmly anchored to the fabric, and the desired water repellent properties are only slightly affected by repeated washing or dry cleaning.

The following examples are illustrative only and should not be construed as limiting the invention. All parts given are parts by weight.

*Example 1*

20 parts of a 50 percent solution in benzene of a methylpolysiloxane resin (monomethyl-, dimethyl-polysiloxane copolymer having $CH_3/Si$ ratio of 1.3) was mixed with 9 parts of a complex formed from the reaction of titanium tetraisopropylate with the ethyl ester of acetoacetic acid (mol ratio 1:2). To this mixture were added 44 parts of a dimethylpolysiloxane fluid having a viscosity of 250 cs. at 25° C and 27 parts of benzene. The resultant clear solution was further diluted with benzene until the total organosiloxane content was 2 percent by weight. An acetate fabric was impregnated with the solution and after 25 minutes curing at 90° C., showed an extraordinary degree of water repellency. The fabric had a soft "hand," and after repeated washing and/or dry cleaning, the fabric was still highly water repellent.

*Example 2*

10 parts of methylsiloxane resin of Example 1 were dissolved in 8 parts of a complex reaction product prepared from 1 mol of titanium tetrabutylate and 2 mols of the ethyl ester of acetoacetic acid. There was added thereto 45 parts of a dimethylpolysiloxane fluid having a viscosity of 550 cs. at 25° C. dissolved in 27 parts of methylene chloride. The mixture was diluted with trichloroethylene to a silicone content of 15 percent by weight. A size-free unbleached cotton cloth was impregnated with this solution, dried, and heated for 15 minutes at 100° C. An extraordinary water repellent effect was obtained which was very resistant to laundering or dry cleaning.

*Example 3*

An extremely good water repellent effect on Perlon and acetate silk was obtained by treating these fabrics with a solution of 18 parts of the methylsiloxane resin of Example 1, 8 parts of titanium acetylacetonate, and 24 parts dimethylpolysiloxane fluid with a viscosity of 200 cs., in 1000 parts of benzene and 1000 parts of methylenechloride.

*Example 4*

2 parts of the methylpolysiloxane resin of Example 1, 10 parts of dimethylpolysiloxane fluid having a viscosity of 350 cs., and 2 parts of zirconium acetylacetonate were dissolved in 486 parts of trichloroethylene. Fabrics made of acetate silk, super polyamides and cotton were impregnated with this solution. The impregnated fabrics, after brief heating to 85° C., had a water repellent effect which was very resistant to laundering and dry cleaning. The fabrics had a good hand and their tear resistance was improved.

*Example 5*

A methylpolysiloxane resin was produced by hydrolysis of 1050 g. methyltrichlorosilane and 390 g. dimethyldichlorosilane and dissolved in toluene to form a 50 percent solution.

To 20 parts of this solution were added 10 parts of a chelate-like titanium compound, which was prepared by reacting 2 mols diacetonal alcohol with 1 mol titanium tetraisopropylate with splitting out of 2 mols isopropyl alcohol. Finally there was added 44 parts dimethylpolysiloxane oil with a viscosity of 250 cs. and 75 parts toluene. The resultant clear solution was diluted with benzene to 2 percent solids content and used for impregnating acetate fabric. After curing for 30 minutes at 90° C., the fabric showed an outstanding water-repellent effect and a soft pleasant hand. Even after several chemical cleanings in trichloroethylene and/or after several wet washings, the water repellent effect was still very good.

*Example 6*

100 g. of a methylsilicone resin, which was prepared by hydrolysis of methyltriethoxysilicane, and 80 parts of a chelate-like complex compound of titanium tetrabutylate and acetoacetic ester were dissolved in 100 parts trichloroethylene. The complex compound was prepared by reacting 1 mol titanium tetrabutylate and 2 mols acetoacetic ester and distilling off the evolved butyl alcohol. To the solution were added 450 g. methylethylsilicone oil with a viscosity of 500 cs. in 270 g. trichloroethylene. The silicone oil was formed by hydrolysis of equal parts dimethyldichlorosilane and diethyldichlorosilane.

A size-free polyacronitrile fabric was impregnated with this mixture, which was diluted beforehand with trichloroethylene to a solids content of 5.5 percent. The solvent was removed by air-drying. After 20 minutes heating to 110° C., an outstandingly water repellent impregnation was obtained, which was very stable against wet washing and chemical cleaning.

*Example 7*

A solution of 36 parts of the methylsiloxane resin solution of Example 5, 8 parts zirconium acetylacetonate, and 24 parts diethylsilicone oil with a viscosity of 200 cs., in 1000 parts benzene and 1000 parts methylene chloride, gave, on Perlon and acetate silk, a very good water repellent effect with simultaneous improvement in tear resistance.

*Example 8*

4 parts of a 50 percent solution of a methylphenylsilicone resin in toluene, 10 parts dimethylsilicone oil of 350 cs., and 3 parts titanium acetylacetonate were dissolved in 484 parts trichloroethylene. The silicone resin was prepared by hydrolysis of 6 parts methyltriethoxysilane and 1 part phenylmethyldiethoxysilane. With this solution were treated various fabrics based on cellulose acetate, superpolyamide and cotton. After brief heating to 115° C., the impregnation on all fabrics was very strongly water repellent and resistant to chemical cleaning.

*Example 9*

The titanium acetylacetonate of Example 8 was replaced by the corresponding amount of malonic ester compound of tetravalent titanium. Impregnation with this solution, carried out in the same manner as in Example 8, gave an outstandingly water repellent effect on various fabrics.

That which is claimed is:

1. A composition of matter consisting essentially of a mixture of (1) an organopolysiloxane oil having the average general formula $$R_nSiO_{\frac{4-n}{2}}$$

where $n$ has an average value of from 1.8 to 2.5 inclusive and R represents a monovalent hydrocarbon radical, (2) an organopolysiloxane resin which is free of polymeric units of the formula $SiO_2$ and which has the average general formula $$R_xSiO_{\frac{4-x}{2}}$$

where R is as above defined and $x$ has an average value of from 1.0 to 1.7 inclusive, and (3) a curing catalyst selected from the group consisting of (A) metal chelates of enols selected from the group consisting of acetylacetone, acetoacetic acid, alkyl esters of acetoacetic acid and alkyl esters of malonic acid, and (B) reaction products of a metal alcoholate with the above defined enols, the metal in said chelates and alcoholate being selected from the group consisting of zirconium and titanium, said mixture being substantially free of any siloxane polymeric units containing silicon-bonded hydrogen atoms.

2. The composition of claim 1 wherein the content of (1) ranges from 50 to 90 percent by weight inclusive based upon the weight of the total organosiloxanes present.

3. The composition of claim 1 wherein the content of the curing catalyst is from 0.5 to 25 percent by weight based upon the total weight of the organopolysiloxanes.

4. The composition of claim 1 wherein R represents a radical selected from the group consisting of methyl and ethyl radicals.

5. A method for hydrophobing textiles which comprises contacting a textile fabric with a mixture of (1) an organopolysiloxane oil having the average general formula $$R_nSiO_{\frac{4-n}{2}}$$

where $n$ has an average value of from 1.8 to 2.5 inclusive and R represents a monovalent hydrocarbon radical, (2) an organopolysiloxane resin which is free of polymeric units of the formula $SiO_2$ and which has the average general formula $$R_xSiO_{\frac{4-x}{2}}$$

where R is as above defined and $x$ has an average value of from 1.0 to 1.7 inclusive, and (3) a curing catalyst selected from the group consisting of (A) metal chelates of enols selected from the group consisting of acetylacetone, acetoacetic acid, alkyl esters of acetoacetic acid, and alkyl esters of malonic acid, and (B) reaction products of a metal alcoholate with the above defined enols, the metal in said chelates and alcoholate being selected from the group consisting of zirconium and titanium, said mixture being substantially free of any siloxane polymeric units containing silicon-bonded hydrogen atoms, and heating the treated fabric until the organopolysiloxanes are cured.

No references cited.